US012706343B2

(12) United States Patent
Huang et al.

(10) Patent No.: US 12,706,343 B2
(45) Date of Patent: Aug. 11, 2026

(54) BATTERY PACK INCLUDING HORIZONTAL CELL STACK STRUCTURE

(71) Applicant: GM Global Technology Operations LLC, Detroit, MI (US)

(72) Inventors: Lu Huang, Troy, MI (US); Hui-ping Wang, Troy, MI (US); Yangbing Zeng, Troy, MI (US); Timothy M. Grewe, Northville, MI (US); Blair E. Carlson, Ann Arbor, MI (US); Yunzhi Xu, Sterling Heights, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 720 days.

(21) Appl. No.: 18/168,737

(22) Filed: Feb. 14, 2023

(65) Prior Publication Data

US 2024/0283075 A1 Aug. 22, 2024

(51) Int. Cl.

| | |
|---|---|
| ***H01M 50/244*** | (2021.01) |
| ***H01M 10/655*** | (2014.01) |
| ***H01M 50/249*** | (2021.01) |
| ***H01M 50/291*** | (2021.01) |

(52) U.S. Cl.

CPC ....... *H01M 50/244* (2021.01); *H01M 10/655* (2015.04); *H01M 50/249* (2021.01); *H01M 50/291* (2021.01); *H01M 2220/20* (2013.01)

(58) Field of Classification Search

CPC ............. H01M 50/244; H01M 10/655; H01M 10/0422; H01M 50/204; H01M 50/249; H01M 2220/20; H01M 10/65; H01M 10/653; B60L 50/64

See application file for complete search history.

(56) References Cited

U.S. PATENT DOCUMENTS

2011/0045334 A1* 2/2011 Meintschel ......... H01M 50/213 429/120
2012/0015235 A1* 1/2012 Fuhr ................... H01M 50/147 429/158
2015/0200427 A1* 7/2015 Haskins ................ H01M 10/63 165/80.4

FOREIGN PATENT DOCUMENTS

CN 115275501 A * 11/2022 .......... H01M 50/204

OTHER PUBLICATIONS

Shepard, J. 18650, 21700, 30700, 4680 and other Li-ions-what's the difference?, batterypowertips.com, Sep. 1, 2021 (Year: 2021).*

* cited by examiner

*Primary Examiner* — Marla D Mcconnell
*Assistant Examiner* — Julia S Caserto
(74) *Attorney, Agent, or Firm* — CANTOR COLBURN LLP

(57) ABSTRACT

A rechargeable energy storage system includes a first plurality of cells arranged in a first horizontal cell stack. Each of the first plurality of cells includes a first diameter, a first end and a second end spaced from the first end by a first distance defining a first cell axis. A second plurality of cells is arranged in a second horizontal cell stack. Each of the second plurality of cells includes a second diameter, a first end portion, and a second end portion that is spaced from the first end portion a second distance defining a second cell axis that is substantially colinear with the first cell axis. A cross beam member is disposed between the first horizontal cell stack and the second horizontal cell stack. The cross beam member absorbs heat from each of the first plurality of cells and the second plurality of cells.

18 Claims, 8 Drawing Sheets

BATTERY PACK INCLUDING HORIZONTAL CELL STACK STRUCTURE

INTRODUCTION

The subject disclosure relates to the art of electrical storage systems and, more particularly, to a battery pack having a horizontal cell stack structure for an electrical energy storage system.

Rechargeable energy storage systems (RESS) typically include one or more battery packs having rechargeable energy storage cells. The battery pack is connectable to an external charging system that replenishes electrical energy lost to a load. The charging system may be part of a vehicle, such as a hybrid vehicle, or may be part of an external charging station. When providing power to a vehicle or other electrical consuming system, the battery pack discharges stored electrical energy. The amount of energy stored and discharged is related to the number and type of rechargeable energy storage cells employed to construct the battery pack.

SUMMARY

A rechargeable energy storage system in accordance with a non-limiting example includes a first plurality of cells arranged in a first horizontal cell stack. Each of the first plurality of cells includes a first diameter, a first end and a second end spaced from the first end by a first distance defining a first cell axis. A second plurality of cells is arranged in a second horizontal cell stack. Each of the second plurality of cells includes a second diameter, a first end portion, and a second end portion that is spaced from the first end portion a second distance defining a second cell axis that is substantially colinear with the first cell axis. A cross beam member is disposed between the first horizontal cell stack and the second horizontal cell stack. The cross beam member is formed from a thermally conductive material that absorbs heat from each of the first plurality of cells and the second plurality of cells.

In addition to one or more of the features described herein the first plurality of cells includes a first cell layer, a second cell layer and a third cell layer, wherein the first diameter of one of the first plurality of cells in the first cell layer is different from the first plurality of cells in one of the second cell layer and the third cell layer.

In addition to one or more of the features described herein a cell housing includes a first dimension and a second dimension, the first cell axis and the second cell axis extend substantially parallel to the first dimension and the first plurality of cells and the second plurality of cells are arranged in a first cell layer that extends substantially parallel to the second dimension.

In addition to one or more of the features described herein the cross beam member includes a first cross beam member positioned at the first end of each of the first plurality of cells of the first horizontal cell stack, a second cross beam member positioned at the second end portion of each of the second plurality of cells of the second horizontal cell stack, and a third cross beam member positioned between the first horizontal cell stack and the second horizontal cell stack.

In addition to one or more of the features described herein each of the first cross beam member, the second cross beam member, and the third cross beam member extend substantially parallel to the second dimension.

In addition to one or more of the features described herein one of the first cross beam member, the second cross beam member and the third cross beam member includes a member having a first surface and a second surface.

In addition to one or more of the features described herein the one of the first cross beam member, the second cross beam member and the third cross beam member includes a plurality of perforations that extend through the member.

In addition to one or more of the features described herein one of the first cross beam member, the second cross beam member and the third cross beam member includes a first member having a first surface and a second surface opposite the first surface and a second member connected with the first member, the second member including a first surface portion and a second surface portion opposite the first surface portion, and a passage extending between the first member and the second member.

In addition to one or more of the features described herein cooling channels extend through the passage.

In addition to one or more of the features described herein surface channels are formed in one of the first surface and the second surface portion.

A vehicle, in accordance with a non-limiting example, includes a body, an electric motor supported relative to the body, and a rechargeable energy storage system supported relative to the body and electrically connected to the electric motor. The rechargeable energy storage system includes a first plurality of cells arranged in a first horizontal cell stack. Each of the first plurality of cells includes a first diameter, a first end and a second end spaced from the first end by a first distance defining a first cell axis. A second plurality of cells is arranged in a second horizontal cell stack. Each of the second plurality of cells includes a second diameter, a first end portion, and a second end portion that is spaced from the first end portion a second distance defining a second cell axis that is substantially colinear with the first cell axis. A cross beam member is disposed between the first horizontal cell stack and the second horizontal cell stack. The cross beam member is formed from a thermally conductive material that absorbs heat from each of the first plurality of cells and the second plurality of cells.

In addition to one or more of the features described herein the first plurality of cells includes a first cell layer, a second cell layer and a third cell layer, wherein the first diameter of one of the first plurality of cells in the first cell layer is different from the first plurality of cells in one of the second cell layer and the third cell layer.

In addition to one or more of the features described herein a cell housing includes a first dimension and a second dimension, the first cell axis and the second cell axis extend substantially parallel to the first dimension and the first plurality of cells and the second plurality of cells are arranged in a first cell layer that extends substantially parallel to the second dimension.

In addition to one or more of the features described herein the cross beam member includes a first cross beam member positioned at the first end of each of the first plurality of cells of the first horizontal cell stack, a second cross beam member positioned at the second end portion of each of the second plurality of cells of the second horizontal cell stack, and a third cross beam member positioned between the first horizontal cell stack and the second horizontal cell stack.

In addition to one or more of the features described herein each of the first cross beam member, the second cross beam member, and the third cross beam member extend substantially parallel to the second dimension.

In addition to one or more of the features described herein one of the first cross beam member, the second cross beam member and the third cross beam member includes a member having a first surface and a second surface.

In addition to one or more of the features described herein the one of the first cross beam member, the second cross beam member and the third cross beam member includes a plurality of perforations that extend through the member.

In addition to one or more of the features described herein one of the first cross beam member, the second cross beam member and the third cross beam member includes a first member having a first surface and a second surface opposite the first surface and a second member connected with the first member, the second member including a first surface portion and a second surface portion opposite the first surface portion, and a passage extending between the first member and the second member.

In addition to one or more of the features described herein cooling channels extend through the passage.

In addition to one or more of the features described herein surface channels formed in one of the first surface and the second surface portion.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
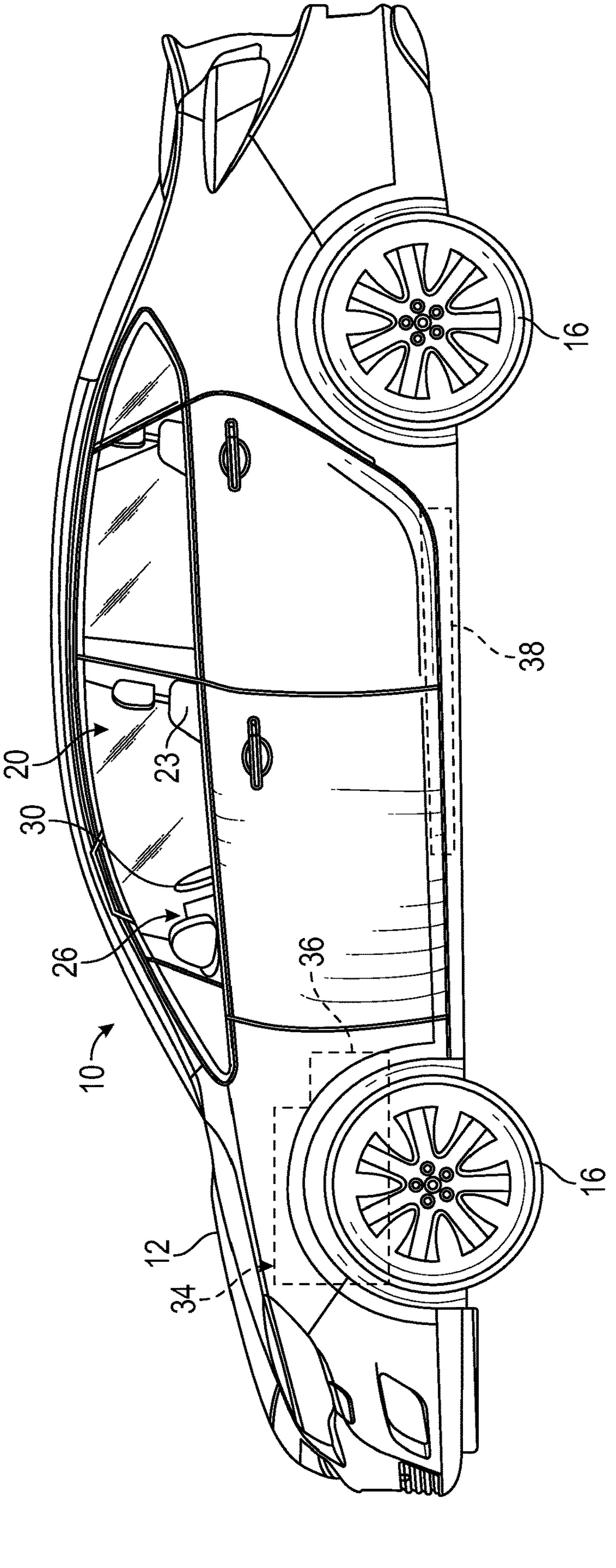
FIG. 1 is a left side view of an electric vehicle including a battery pack having a horizontal cell stack structure, in accordance with a non-limiting example.

The following description is merely exemplary in nature and is not intended to limit the present disclosure, its application or uses. It should be understood that throughout the drawings, corresponding reference numerals indicate like or corresponding parts and features.

Currently, battery pack components, structural, thermal, electrical and the like are designed around a vertical stacking of energy storage cells. The vertical stacking, taken together with supporting systems, imposes limits on battery pack construction and dimensions. Limiting battery pack design constrains battery pack efficiency and energy density. Accordingly, it is desirable to create a battery pack design that provides greater flexibility in construction options that reduces overall dimension dependence on cell dimensions.

A vehicle, in accordance with a non-limiting example, is indicated generally at 10 in FIG. 1. Vehicle 10 includes a body 12 supported on a plurality of wheels 16. Two of the plurality of wheels 16 are steerable. Body 12 defines, in part, a passenger compartment 20 having seats 23 positioned behind a dashboard 26. A steering control 30 is arranged between seats 23 and dashboard 26. Steering control 30 is operated to control orientation of the steerable wheel(s).

Figure 2:
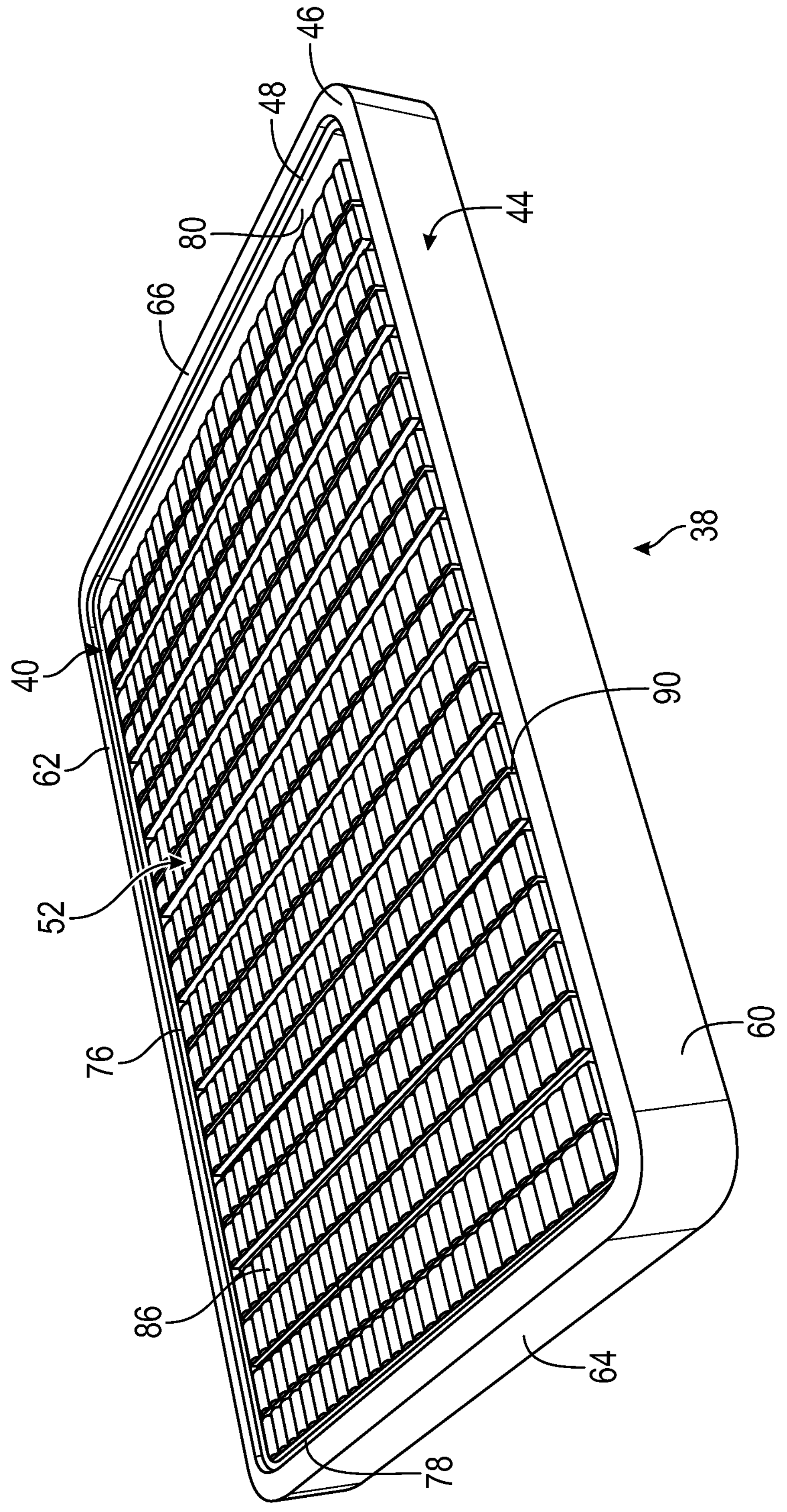
FIG. 2 is a perspective view of the battery pack having the horizontal cell stack structure, in accordance with a non-limiting example.
Figure 3:
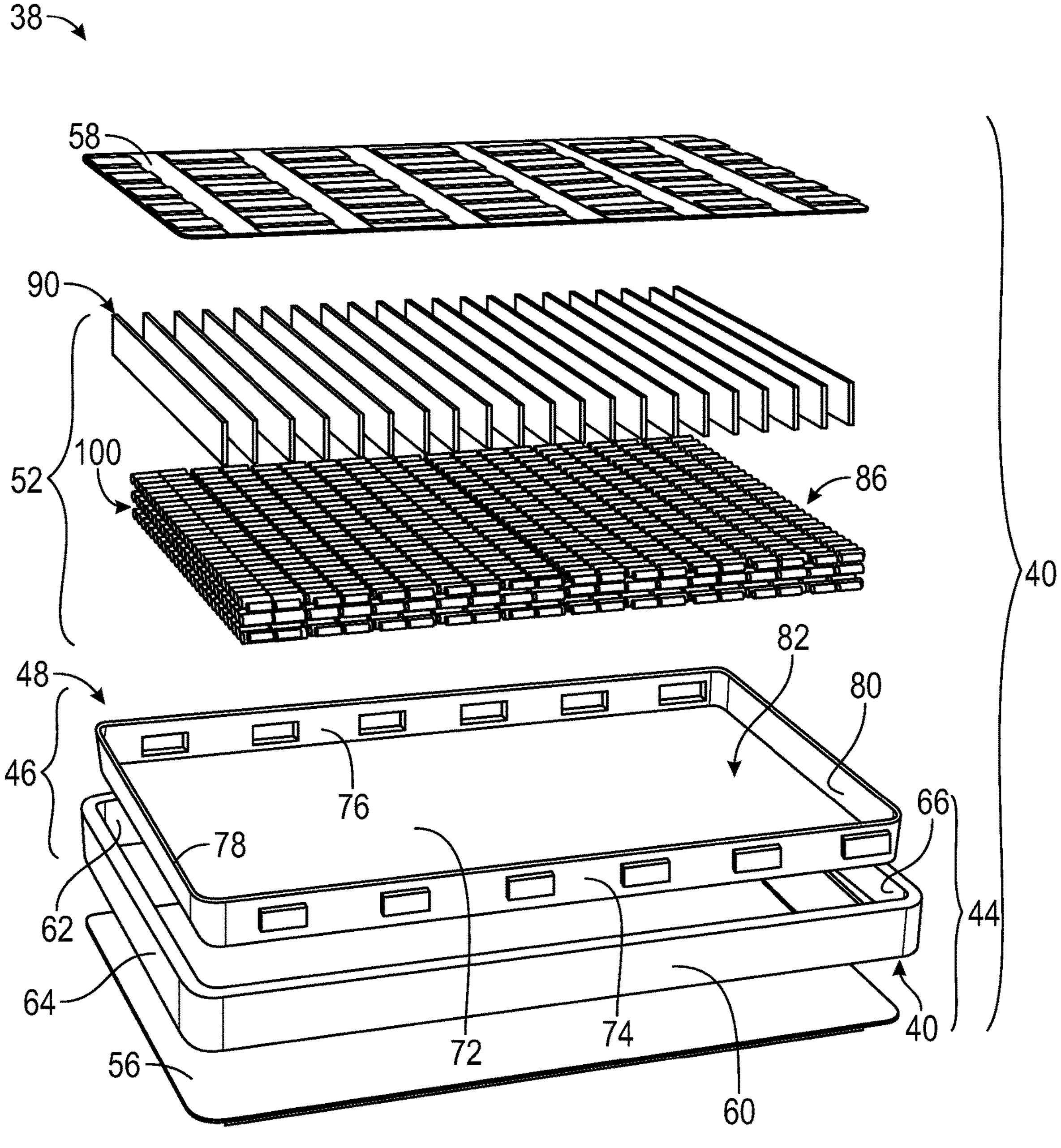
FIG. 3 is a disassembled view of the battery pack having a horizontal cell stack structure, in accordance with a non-limiting example.

Vehicle 10 includes an electric motor 34 connected to a transmission 36 that provides power to one or more of the plurality of wheels 16. A rechargeable energy storage system (RESS) 38 is arranged in body 12 and provides power to electric motor 34. At this point, it should be understood that the location of electric motor 34, transmission 36, and RESS 38 in body 12 may vary. Referring to FIGS. 2 and 3, RESS 38 includes a battery pack 40.

Battery pack 40 includes a cell housing 44 formed by a frame enclosure 46, a bottom tray 48, and a cell assembly 52. Battery pack 40 is also shown to include a bottom shear plate 56 and a top shear plate 58 that close off battery pack 40. Frame enclosure 46 includes a first side member 60, a second side member 62, a third side member 64, and a fourth side member 66. Second side member 62 is substantially parallel to and opposite first side member 60 and fourth side member 66 is substantially parallel to and opposite third side member 64. First side member 60 and second side member 62 define a first dimension of cell housing 44. Third side member 64 and fourth side member 66 define a second dimension of cell housing 44. In a non-limiting example, the first dimension defines a length of cell housing 44 and the second dimension defines a width of cell housing 44.

As further shown in FIGS. 2 and 3, bottom tray 48 is surrounded by frame enclosure 46 and includes a base member 72, a first side wall 74, a second side wall 76, a third side wall 78, and a fourth side wall 80 that collectively define a cell receiving zone 82. A plurality of energy storage cells 86 are arranged in cell receiving zone 82. Energy storage cells 86 may be electrically connected in one or more configurations. Further, energy storage cells 86 are arranged in horizontal storage cell stacks formed from a plurality of layers that are separated by a plurality of cross beams 90. The plurality of cross beams 90 is formed from a thermally conductive material that facilitates heat transfer from energy storage cells 88 as well as functions as structural integrity enhancing members for battery pack 40. The plurality of cross beams 90 is also designed to absorb cell expansion due to changes in operating temperatures.

Figure 4:
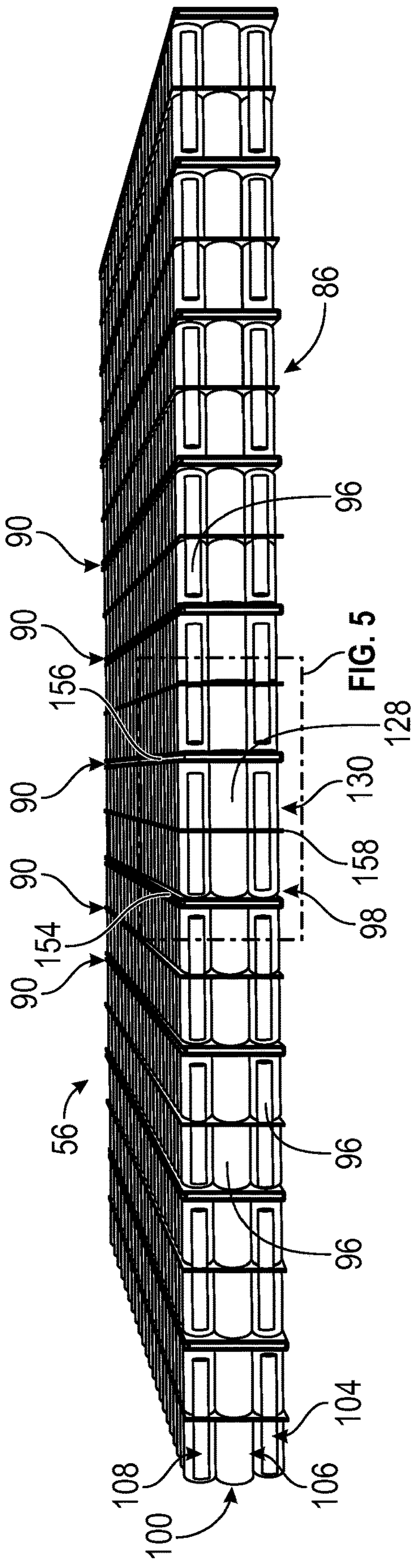
FIG. 4 is a perspective view of the battery pack stack having the horizontal cell stack structure, in accordance with a non-limiting example.
Figure 5:
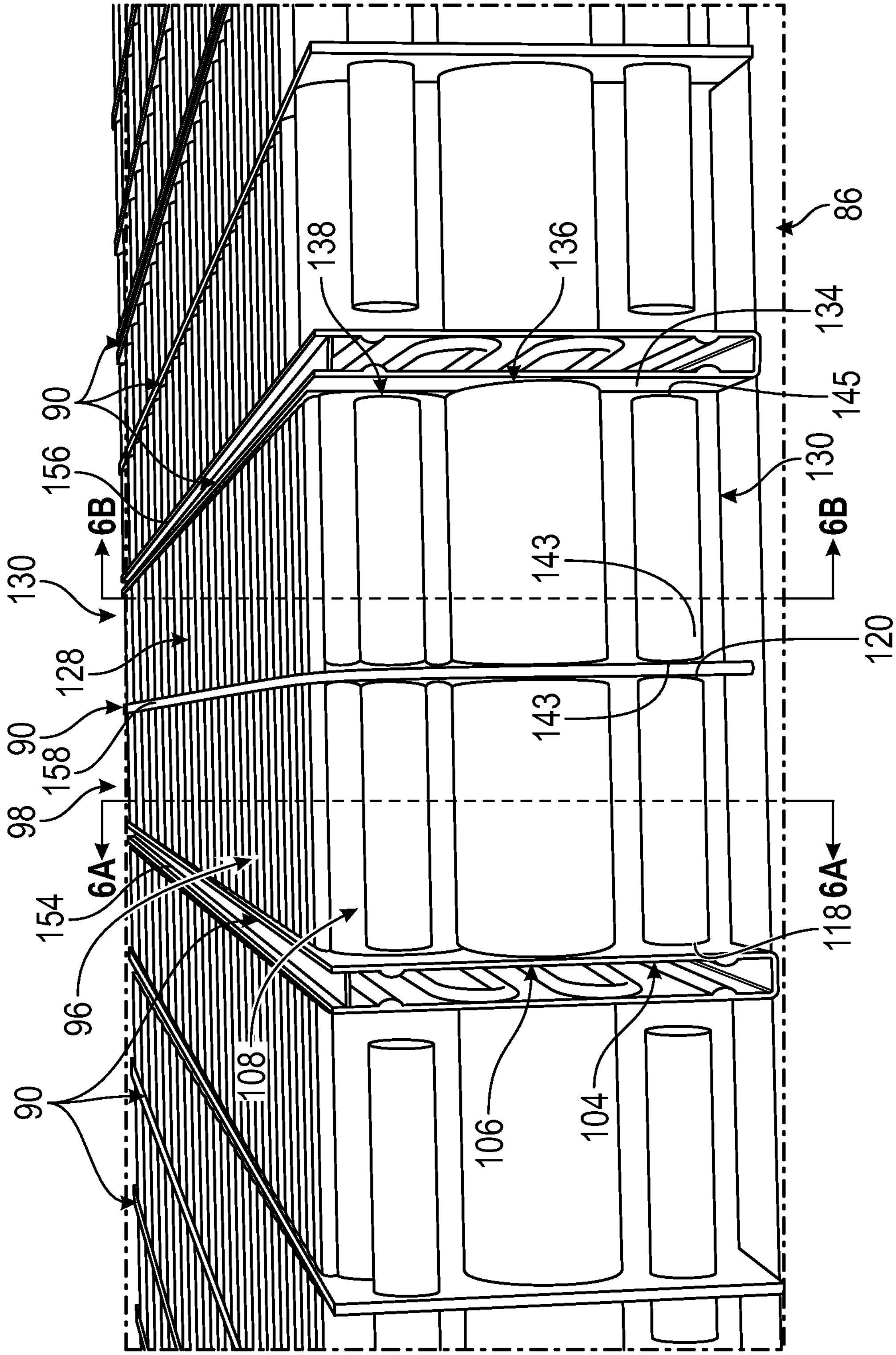
FIG. 5 is a detail view of a portion of the battery pack of FIG. 4 showing a number of horizontal cell stacks, in accordance with a non-limiting example.

Referring to FIGS. 4 and 5, energy storage cells 86 include a first plurality of cells 96 arranged in a first horizontal cell stack 98. First horizontal cell stack 98 is formed from a plurality of cell layers 100 including a first cell layer 104, a second cell layer 106, and a third cell layer 108. Each cell layer 104, 106, and 108 extends across the width of cell housing 44. The number of cell layers that form first horizontal cell stack 98 may vary and could be dependent upon battery power requirements, packaging requirements and the like.

Figure 6A:
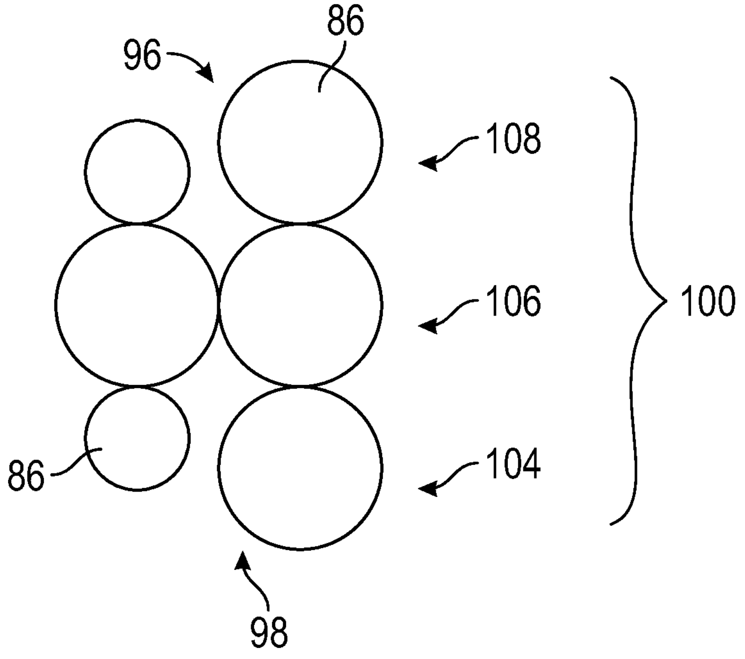
FIG. 6A is an axial end view of a first horizontal cell stack, in accordance with a non-limiting example.

As shown in FIG. 6A, an axial end view of a portion of the first plurality of cells 96 in first cell layer 104 include a diameter that may be different from others of the first plurality of cells 96 in that layer. The first plurality of cells 96 in second cell layer 106 includes a diameter that is substantially similar, and a portion of the first plurality of cells 96 in third cell layer 108 includes a diameter that is different from others of the first plurality of cells in that layer. At this point, it should be understood that the first diameter, second diameter, and the third diameter may be the same, or different depending upon battery power requirements. The first plurality of cells 96 are arranged to form first horizontal cell stack 98 such that the first cell layer 104, the second cell layer 106, and the third cell layer 108 extend from about first side wall 74 to about second side wall 76 across base member 72 of bottom tray 48, FIG. 3.

Reference will follow to FIG. 5 in describing first plurality of cells 96 in first cell layer 104 with an understanding that other than possible dimensional differences, the first plurality of cells 96 in second cell layer 106 and third cell layer 108 are similar. Each of the first plurality of energy storage cells 86 in first cell layer 104 includes a first end 118 and a second end 120. Second end 120 is opposite to and spaced from first end 118 along a first cell axis that is substantially parallel to, for example, first side member 60 and second side member 62 of frame enclosure 46.

Figure 6B:
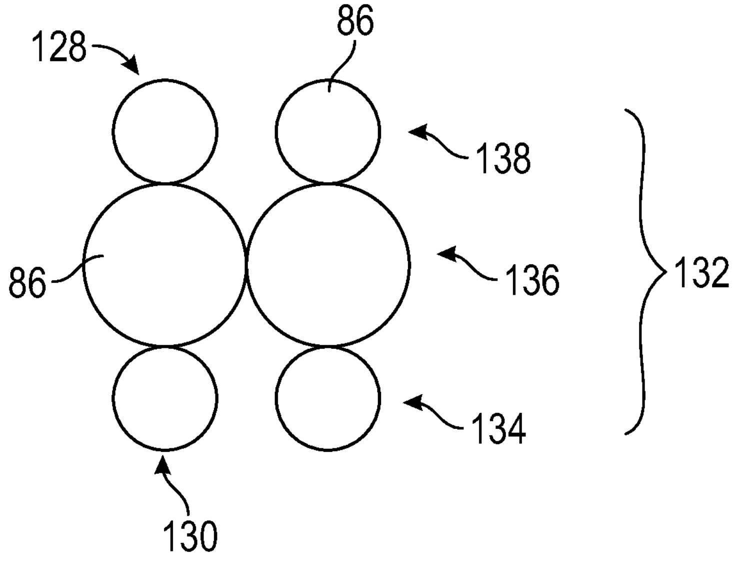
FIG. 6B is a axial end view of a second horizontal cell stack, in accordance with a non-limiting example.

As shown in FIGS. 5 and 6B, energy storage cells 86 also includes a second plurality of cells 128 arranged in a second horizontal cell stack 130 formed from a second plurality of cell layers 132 including a first cell layer 134, a second cell layer 136, and a third cell layer 138. The number of cell layers that form second horizontal cell stack 130 may vary and could be dependent upon battery power requirements, packaging requirements and the like.

As shown in FIG. 6B, a portion of the second plurality of cells 128 in first cell layer 134 include a diameter that is different from others of the second plurality of cells 128 in that layer. The second plurality of cells 96 in second cell layer 136 includes a diameter that is substantially similar, and a portion of the second plurality of cells 128 in third cell layer 138 includes a diameter that is different from others of the first plurality of cells in that layer. At this point, it should be understood that the first diameter, second diameter, and the third diameter may be the same, or different depending upon battery power requirements. The second plurality of cells 128 are arranged to form second horizontal cell stack 130 such that the first cell layer 134, the second cell layer 136, and the third cell layer 138 extend from about first side wall 74 to about second side wall 76 across base member 72 of bottom tray 48, FIG. 3. At this point, it should be understood that the number of horizontal cell stacks and cell layers may vary as may the number and type of energy storage cells 86 in each cell layer.

Reference will follow to FIG. 5 in describing second plurality of cells 128 in first cell layer 134 of second horizontal cell stack 130 with an understanding that other than possible dimensional differences, the second plurality of cells 128 in second cell layer 136 and third cell layer 138 of second horizontal cell stack 130 may be similar. Each of the second plurality of cells 128 in first cell layer 134 of second horizontal cell stack 130 includes a first end portion 143 and a second end portion 145. Second end portion 145 is opposite to and spaced from first end portion 143 along a second cell axis that is substantially co-linear with the first cell axis and is substantially parallel to, for example, first side member 60 and second side member 62 of frame enclosure 46.

Figure 7:
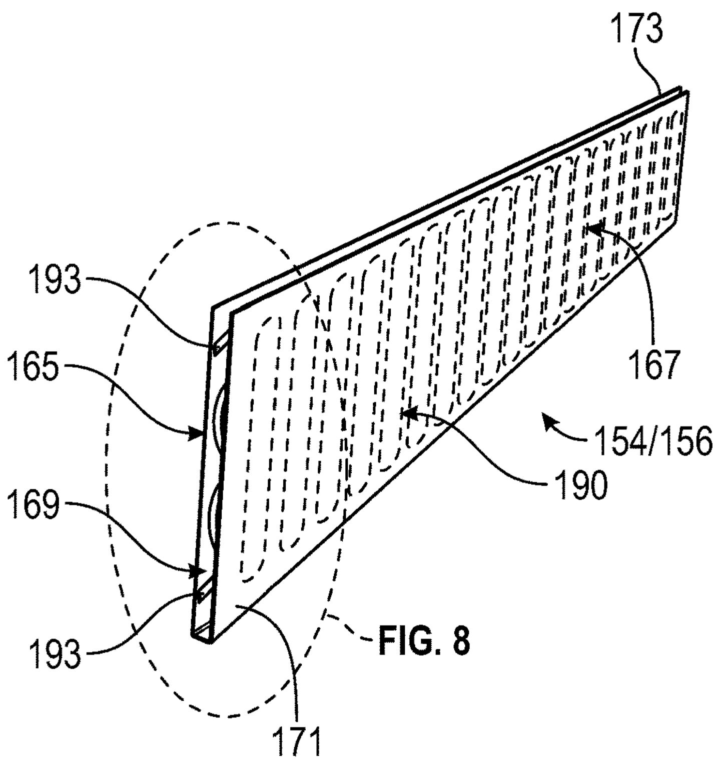
FIG. 7 is a perspective view of a first cross beam, in accordance with a non-limiting example.
Figure 8:
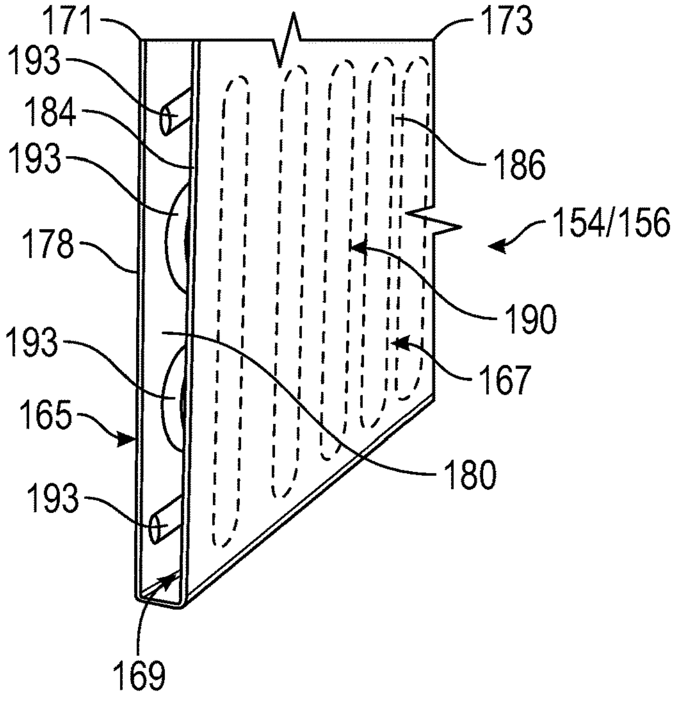
FIG. 8 is a detail view of an end portion of the first cross beam of FIG. 7, in accordance with a non-limiting example.

As shown in FIG. 5, a first cross beam member 154 is arranged at first end 118 of each of the first plurality of cells 96 of first horizontal cell stack 98, a second cross beam member 156 is arranged at second end portion 145 of each of the second plurality of cells 128, and a third cross beam member 158 is disposed between first horizontal cell stack 98 and second horizontal cell stack 130. Reference will now follow to FIGS. 7 and 8 in describing first cross beam member 154 with an understanding that second cross beam member 156 includes similar structure. In addition to providing a cooling function, first cross beam member 154, second cross beam member 156, and third cross beam member 158 provide structural support, absorb cell expansion due to changes in operating conditions, and may also be configured to support electrical connectors (not shown) that operatively connect the plurality of energy storage cells 86.

First cross beam member 154 includes a first member 165 and a second member 167. Second member 167 is joined to first member 165. In a non-limiting example, first member 165 and second member 167 may be integrally formed. Second member 167 may be joined to first member 165 through a variety of known techniques including welding, mechanical connections, 3D printing and the like. A passage 169 is arranged between first member 165 and second member 167. In a non-limiting example, first cross beam member 154 includes a first end section 171 which, when installed, is arranged adjacent to first side member 60 of frame enclosure 46 (FIG. 2) and a second end section 173 that is arranged adjacent to second side member 62 of frame enclosure 46.

First member 165 includes a first surface 178 and a second surface 180 that is opposite first surface 178. Second member 167 includes a first surface portion 184 and a second surface portion 186 that is opposite to first surface portion 184. Second surface 180 and first surface portion 184 face passage 169. In a non-limiting example, second surface portion 186 includes a plurality of surface channels 190. Surface channels 190 extend substantially parallel to first end section 171 and second end section 173 and are configured to direct air currents, that may flow under and/or over cell assembly 52 over first surface 178 and/or second surface portion 186 to facilitate off-gassing of energy storage cells 86. First surface 178 may include similar structure.

Figure 9:
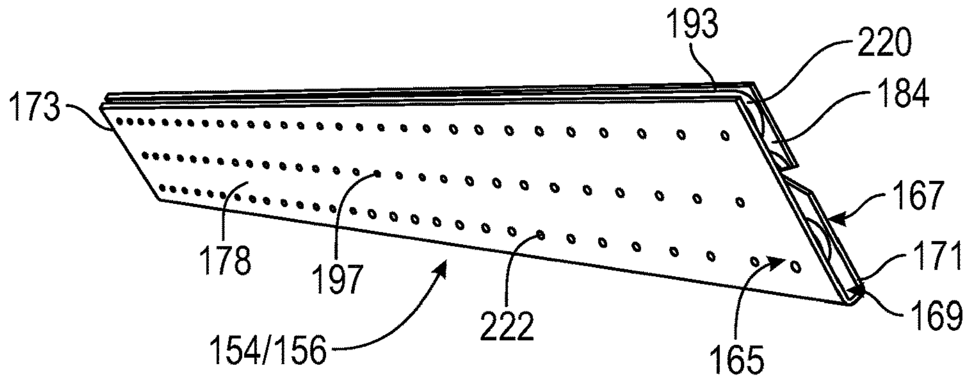
FIG. 9 is a perspective view of the first cross beam, in accordance with another non-limiting example.

In a non-limiting example, a plurality of cooling channels, indicated at 193, extend through passage 169. Cooling channels 193 may be mounted to or directly formed into second surface 180 of first member 165 and/or first surface portion 184 of second member 167. Cooling channels 193 may transport a cooling fluid (not shown) which may take the form of a liquid, a gas, or a two-phase material, in a heat exchange contact with first cross beam member 154. The cooling fluid absorbs heat from first member 165 and/or second member 167 generated by the plurality of energy storage cells 86 when charging and/or discharging. As shown in FIG. 9, instead of surface channels, a plurality of perforations 197 may be formed in first member 165 and/or second member 167. Perforations 197 allow air currents to pass through first cross beam member 154 to reduce localized temperatures as well as allowing off-gassing of energy storage cells 86.

Figure 10:
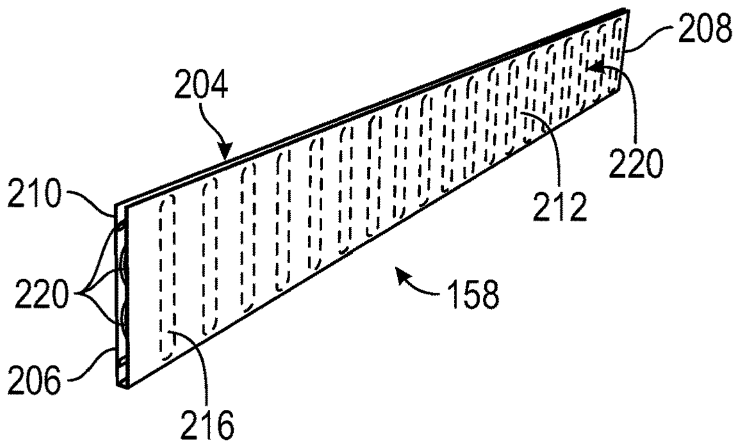
FIG. 10 is a perspective view of a second cross beam, in accordance with a non-limiting example.

Reference will now follow to FIG. 10 in describing third cross beam member 158 in accordance with a non-limiting example. Third cross beam member 158 includes a member 204 having a first end segment 206 arranged adjacent to first side member 60 of frame enclosure 46 and a second end section 208 arranged adjacent to second side member 62 of frame enclosure 46. Member 204 includes a first surface 210 and a second surface 212 that is opposite to first surface 210.

Figure 11:
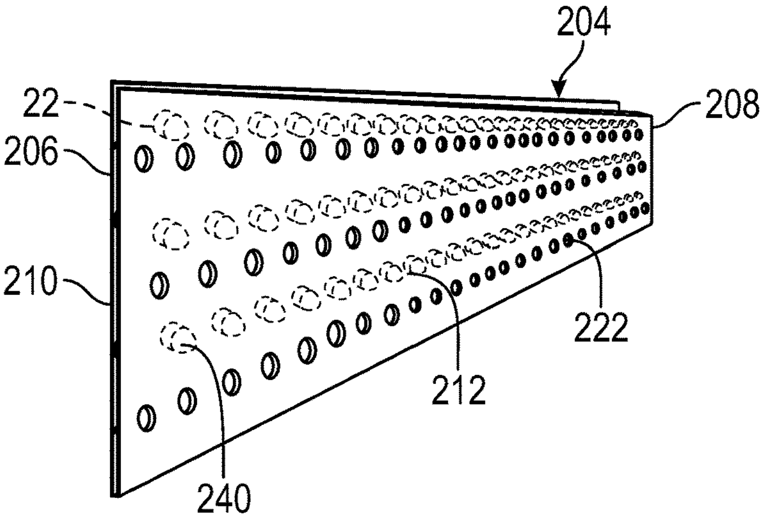
FIG. 11 is a perspective view of the second cross beam, in accordance with another non-limiting example.

In one non-limiting example, a plurality of off-gassing channels 220 may be formed on one or both of first surface 210 and second surface 212 as shown in FIG. 10. In another non-limiting example, a plurality of perforations 222 may extend through first surface 210 and second surface 212 of member 204 as shown in FIG. 11. Off-gassing channels 220 and/or perforations 222 are arranged to facilitate the release of gas from energy storage cells 86. In a non-limiting example, a plurality of spacers 240 formed from an elastic material may be arranged between first surface 210 and second surface 212. Spacers 240 are positioned so as to enable elastic deformation of third cross beam member 158 in the direction that is transvers to first surface 210 and second surface 212. The deformation is enabled to accommodate expansion of energy cells 86.

At this point, it should be understood that the use of horizontal stacks provides enhanced flexibility in battery pack design. In addition to being more compact, the horizontal stacking supported by cross beams enhances cell-to-cell cooling, structural integrity by absorbing cell expansion due to changes in operating temperatures, and also provides structure for supporting electrical connectors. Further, it should be understood that while described in terms of automotive use, the battery pack may be employed in other systems including mobile systems and stationary systems.

The terms “a” and “an” do not denote a limitation of quantity, but rather denote the presence of at least one of the referenced items. The term “or” means “and/or” unless clearly indicated otherwise by context. Reference throughout the specification to “an aspect”, means that a particular element (e.g., feature, structure, step, or characteristic) described in connection with the aspect is included in at least one aspect described herein, and may or may not be present in other aspects. In addition, it is to be understood that the described elements may be combined in any suitable manner in the various aspects.

When an element such as a layer, film, region, or substrate is referred to as being “on” another element, it can be directly on the other element or intervening elements may also be present. In contrast, when an element is referred to as being “directly on” another element, there are no intervening elements present.

Unless specified to the contrary herein, all test standards are the most recent standard in effect as of the filing date of this application, or, if priority is claimed, the filing date of the earliest priority application in which the test standard appears.

Unless defined otherwise, technical, and scientific terms used herein have the same meaning as is commonly understood by one of skill in the art to which this disclosure belongs.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A rechargeable energy storage system comprising:

a plurality of cell units, the plurality of cell units comprising a first cell unit, a second cell unit adjacent to one side of the first cell unit, and a third cell unit adjacent to another side of the first cell unit; and a first cross beam member disposed between the first cell unit and the second cell unit, and a third cross beam member disposed between the first cell unit and the third cell unit, wherein each of the cell units comprises:

a plurality of first cells arranged in a first horizontal cell stack, each of the first cells including a first end and a second end spaced from the first end by a first distance defining a first cell axis;

a plurality of second cells arranged in a second horizontal cell stack, each of the second cells including a first end portion and a second end portion that is spaced from the first end portion a second distance defining a second cell axis that is substantially colinear with the first cell axis; and a second cross beam member disposed between the first horizontal cell stack and the second horizontal cell stack, wherein the plurality of first cells comprises cells having different diameters and the plurality of second cells comprises cells having different diameters, wherein each of the first, second, and third cross beam member comprises a thermally conductive material that absorbs heat from the plurality of first cells and/or the plurality of second cells, wherein the second cross beam member comprises a pair of vertical walls spaced apart from each other with elastic spacers extending therebetween, wherein each of the first and third cross beam members comprises a pair of vertical walls spaced apart from each other, and a pair of horizontal walls spaced apart from each other along a vertical direction, wherein a passage is defined within the vertical walls and the horizontal walls of each of the first and third cross beam members, and wherein cooling channels are disposed within the passage and mounted on each of the vertical walls of the first and third cross beam members with a gap therebetween, the cooling channels being configured to transport a cooling fluid therewithin.

2. The rechargeable energy storage system according to claim 1, wherein the plurality of first cells includes a first cell layer, a second cell layer, and a third cell layer, and wherein one of the first cells in the first cell layer has a different diameter from one of the first cells in the second cell layer or the third cell layer.

3. The rechargeable energy storage system according to claim 1, further comprising a cell housing having a first dimension and a second dimension, the first cell axis and the second cell axis extending substantially parallel to the first dimension and the plurality of first cells and the plurality of second cells being arranged in a first cell layer that extends substantially parallel to the second dimension.

4. The rechargeable energy storage system according to claim 1, wherein each of the first cross beam member and the third cross beam member includes a plurality of perforations that extend through each of the vertical walls.

5. The rechargeable energy storage system according to claim 1, wherein each of the first cross beam member and the third cross beam member comprises surface channels formed on each of the vertical walls on a surface thereof facing away from the passage.

6. A vehicle comprising:

a body;

an electric motor supported relative to the body; and a rechargeable energy storage system supported relative to the body and electrically connected to the electric motor, the rechargeable energy storage system comprising:

a plurality of cell units, the plurality of cell units comprising a first cell unit, a second cell unit adjacent to one side of the first cell unit, and a third cell unit adjacent to another side of the first cell unit; and a first cross beam member disposed between the first cell unit and the second cell unit, and a third cross beam member disposed between the first cell unit and the third cell unit, wherein each of the cell units comprises:

a plurality of first cells arranged in a first horizontal cell stack, each of the first cells including a first end and a second end spaced from the first end by a first distance defining a first cell axis;

a plurality of second cells arranged in a second horizontal cell stack, each of the second cells including a first end portion and a second end portion that is spaced from the first end portion a second distance defining a second cell axis that is substantially colinear with the first cell axis;

a second cross beam member disposed between the first horizontal cell stack and the second horizontal cell stack, wherein the first cells comprises cells having different diameters and the second cells comprises cells having different diameters, wherein each of the first, second, and third cross beam member comprises a thermally conductive material that absorbs heat from the first cells and/or the second cells, wherein the second cross beam member comprises a pair of vertical walls spaced apart from each other with elastic spacers extending therebetween, wherein each of the first and third cross beam members comprises a pair of vertical walls spaced apart from each other, and a pair of horizontal walls spaced apart from each other along a vertical direction, wherein a passage is defined within the vertical walls and the horizontal walls of each of the first and third cross beam members, and wherein cooling channels are disposed within the passage and mounted on each of the vertical walls of the first and third cross beam members with a gap therebetween, the cooling channels being configured to transport a cooling fluid therewithin.

7. The vehicle according to claim 6, wherein the plurality of first cells includes a first cell layer, a second cell layer, and a third cell layer, and wherein one of the first cells in the first cell layer has a different diameter from one of the first cells in the second cell layer or the third cell layer.

8. The vehicle according to claim 6, further comprising a cell housing having a first dimension and a second dimension, the first cell axis and the second cell axis extending substantially parallel to the first dimension and the plurality of first cells and the plurality of second cells being arranged in a first cell layer that extends substantially parallel to the second dimension.

9. The vehicle according to claim 6, wherein each of the first cross beam member and the third cross beam member includes a plurality of perforations that extend through each of the vertical walls.

10. The vehicle according to claim 6, wherein each of the first cross beam member and the third cross beam member comprises surface channels formed on each of the vertical walls on a surface thereof facing away from the passage.

11. The rechargeable energy storage system according to claim 1, wherein two of the plurality of first cells that overlap each other along the vertical direction have different diameters.

12. The rechargeable energy storage system according to claim 1, wherein the second cross beam member comprises a lower wall extending between the vertical walls of the second cross beam member.

13. The rechargeable energy storage system according to claim 1, wherein the second cross beam member comprises a plurality of perforations extending through each of the vertical walls of the second cross beam member.

14. The rechargeable energy storage system according to claim 13, wherein, in the second cross beam member, each of the plurality of perforations is vertically offset from the elastic spacers.

15. The vehicle according to claim 6, wherein two of the plurality of first cells that overlap each other along the vertical direction have different diameters.

16. The vehicle according to claim 6, wherein the second cross beam member comprises a lower wall extending between the vertical walls of the second cross beam member.

17. The vehicle according to claim 6, wherein the second cross beam member comprises a plurality of perforations extending through each of the vertical walls of the second cross beam member.

18. The vehicle according to claim 17, wherein, in the second cross beam member, each of the perforations is vertically offset from the elastic spacers.

* * * * *